United States Patent Office 3,729,341
Patented Apr. 24, 1973

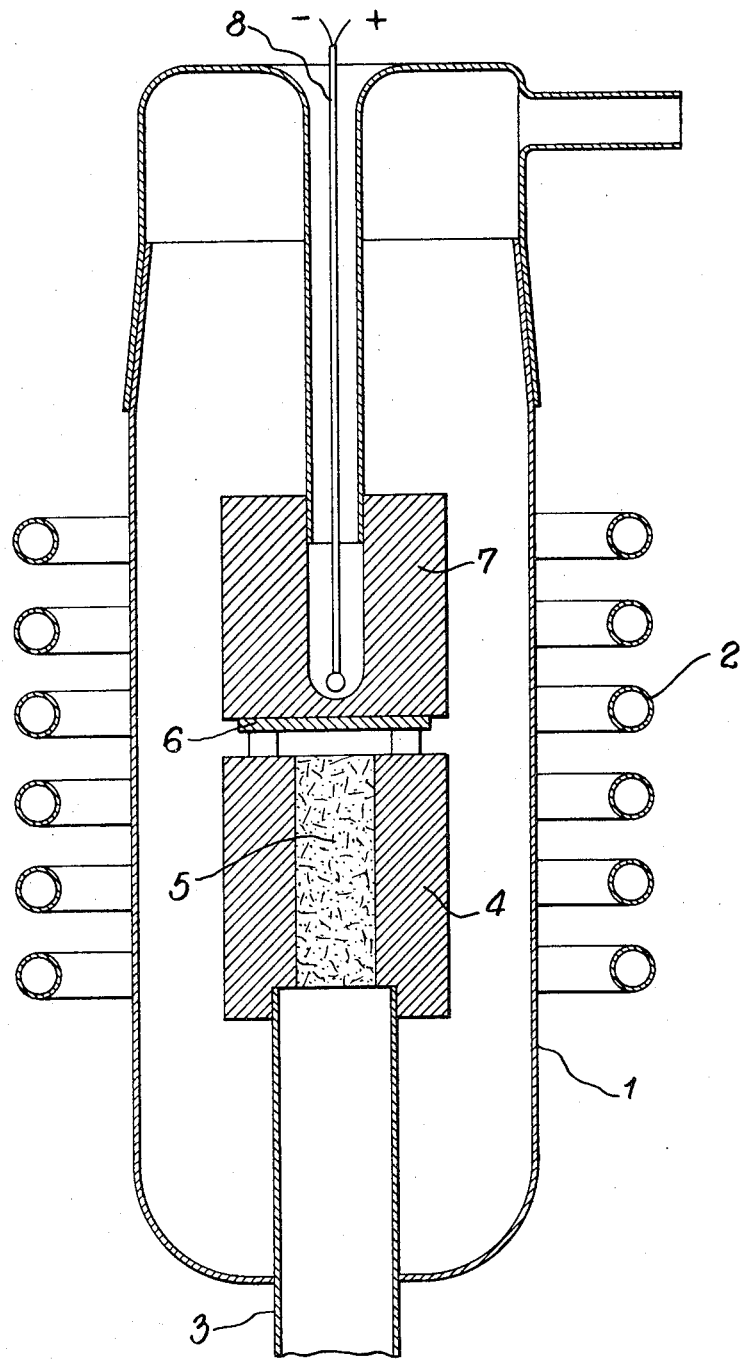

3,729,341
METHOD FOR PRODUCING EPITAXIAL III–V SEMICONDUCTOR LAYERS CONTAINING GALLIUM
Wolfgang Dietz and Hartmut Seiter, Munich, Bavaria, Germany, assignors to Consortium fur Elektrochemische Industrie G.m.b.H., Munich, Germany
Filed Nov. 5, 1970, Ser. No. 87,080
Claims priority, application Germany, Nov. 6, 1969, P 19 55 971.8
Int. Cl. C23c 11/00, 13/00; H01l 7/36
U.S. Cl. 117—201  10 Claims

ABSTRACT OF THE DISCLOSURE

A method and apparatus for producing epitaxial III–V semiconductor layers of gallium in two stages, where in the first stage gallium-I-chloride is produced by heating a gas stream consisting of hydrogen and gallium-III-chloride to a temperature of 700–900° C. in the presence of a catalyst consisting of an element of the 5th, 6th or 8th sub-group of the Periodic System, and in the second stage said gallium-I-chloride is converted into a gas stream of III–V semiconductor material by heating said gallium-I-chloride to a temperature of 600–700° C. in admixture with an element of the 5th main group of the Periodic System, and then said III–V semiconductor material is deposited on a semiconductor substrate.

---

The production of epitaxial III–V semiconductor layers of gallium is done in accordance with known methods through the gaseous phase. One begins with a basic substance of gallium or gallium-semiconductor material and converts it at a temperature of over 900° C. in a stream of hydrogen chloride into gaseous gallium-I-chloride. The latter is stable only at high temperatures, and at a lower temperature it disproportionates into elementary gallium and gallium-III-chloride. This effect is used to separate the gallium which was formed in a colder zone, with arsenic- or phosphorus-vapor on a monocrystalline substrate as a semiconductor layer ("Gallium Arsenide," 1966 Symp. proc.; Inst. of Physics and Phys. Soc. Conf. Ser. No. 3, London 1967 and Burmeister Trans. Met. Soc. AIME (1969) (3) 587–92). A drawback of this method is the requirement of large apparatus and the difficulties caused by the basic substance reaction to carry out a uniform and reproducible deposition.

We have now discovered a method for producing epitaxial III–V semiconductor layers of gallium which avoids these drawbacks. Our method is characterized by the fact that we produce in a first stage at a temperature of 700–900° C., in the presence of a catalyst consisting of an element of the 5th, 6th or 8th sub-group of the Periodic System, gallium-I-chloride from a gas stream consisting of hydrogen and gallium-III-chloride; and in a second stage at a temperature of 600–700° C. we convert said gallium-I-chloride with an element of the 5th main group of the Periodic System into III–V semiconductor material and separate it on a monocrystalline substrate epitaxially in a known manner, while compounds of the elements of the 5th main group are added to the gas stream separately or in mixture before or after the first stage.

In the method of the invention all reaction components are piped into the conversion vessel in gaseous form, which makes possible a simple and repeatable adjustment of the concentrations in the reaction gas. Also, one obtains a greater leeway in choosing the test conditions, such as the concentration of the reaction partners in the gaseous phase or the speed of the stream.

The catalyst has a special significance in this method. On the one hand, by using it one can choose a relatively low temperature for producing the gallium-I-chloride from gallium-III-chloride by reduction with hydrogen. On the other hand, a high linear stream speed is possible, without reducing the yield of gallium semiconductor material significantly. Moreover, the relatively low temperature of the reduction zone (700–900° C.) and the short staying period of the reaction gas therein reduces the absorption of impurities from the vessel's material. Also, the high linear speed stream of 3–30 cm./sec. favors a uniform growth of the epitaxial layer in the zone of low temperature (600–700° C.).

Sutiable as catalysts are all elements of the 5th, 6th and 8th sub-groups of the Periodic System, e.g. niobium, tantalum, nickel, palladium and platinum. Preferably tungsten or molybdenum are used. One can also use alloys or several of these metals together.

In general the method is carried out as follows: A gas stream of highly purified hydrogen is charged with gallium-III-chloride with the aid of an evaporator. The percentage of the gallium-III chloride content in the hydrogen stream is set by the evaporation temperature and the stream speed. Preferred is the use of a gas stream with 0.05–1% by volume of gallium-III-chloride. It is also possible for the gas stream to contain up to 90% by volume of argon. The stream speed is determined by a flow velocity meter, and is set by a needle valve. The gas jet produced in this manner is piped into a vessel which is heated to 700–900° C. and which contains the catalyst finely dispersed, often in the form of thin wire. There gallium-III-chloride is reduced by hydrogen to gallium-I-chloride.

Subsequently the gas stream which now contains gallium-I-chloride, is carried into a low-temperature zone (600–700° C.). There the disproportioning into gallium- and gallium-III-chloride takes place. The temperature difference between the first and the second stage, i.e. between the reduction zone and the separation zone, is generally at least 100° C., but the method can also be carried out at a lower temperature difference.

As elements of the 5th main group one uses principally arsenic and/or phosphorus. The feeding is done by compounds of these elements which decompose under the reaction conditions employed. Thus for instance one can add to the stream of gallium-III-chloride—hydrogen from the start a gas stream of hydrogen and compounds of an element of the 5th main group—which was likewise produced by evaporators. It is also possible to carry the two gas streams separately through the zone of higher temperature and to merge them only in the zone of lower temperature. According to a further work method, the gas stream charged with a compound of an element of the 5th main group is piped in only in the zone of low temperature. In all cases the elements of the 5th main group are formed from the compounds under the influence of the temperature and/or the hydrogen.

Suitable compounds for producing the elements of the 5th main group are for instance the halides and the hydrides. One uses preferably hydrogenated arsenic or arsenic trichloride and hydrogen phosphide or phosphorus trichloride. The elements obtained therefrom are separated epitaxially as gallium semiconductor layer with the gallium that was formed by disproportioning as described above.

Particularly suitable for producing monocrystalline mixed crystal layers are mixtures of arsenic and phosphorus compounds.

Doping substances can be added to the gas streams in the first as well as in the second stage. Suitable for p-doping are for instance organic cadmium or zinc compounds, particularly diethyl zinc; for n-doping for instance hydrides and organic compounds of selenium and tellurium, particularly selenium hydride.

For depositing "semiinsulating" III–V semiconductor layers of gallium volatile chromium compounds like chromyl chloride or chromium hexacarbonyl are added to the gas stream (G. R. Cronin and R. W. Haisty, J. Elektrochem. Soc. 111 874–7, 1964). Suitable substrate materials are not only monocrystalline semiconductors like for instance gallium arsenide, gallium phosphide and silicon, but also insulator monocrystals like for instance sapphire or magnesium-aluminum-spinel.

The invention is described in connection with the accompanying drawing which is a diagrammatic sectional view of an apparatus for carrying out the method of the invention.

The drawing shows a quartz vessel 1, which is surrounded by a device 2 for inductive heating. An input pipe 3 extending into vessel 1 is connected to a structural pipe-like element 4 consisting of graphite or molybdenum, containing the catalyst 5, and at the end of the pipe-like structural element 4 the substrate 6 is installed on the substrate holder 7 at right-angles to the input pipe 3, as shown in the drawing. The device 2 for inductive heating is generally a copper coil which in most cases can be cooled by water. The pipe-like structural element 4 consisting of graphite or molybdenum is heated by this device just like the substrate holder 7. The necessary temperature gradient between parts 4 and 7 is created by the different specific resistances of the structural substances used or by the different geometric dimensions. The temperature of the structural element 4 is measured by a pyrometer which is applied in the holder 7 by a thermoelement 8, as illustrated. This described device causes the gas mixture emerging from the pipe-like structural element 4 to hit directly the substrate 6 carried by the holder 7, which is held at a constant temperature by the induction-heated holder.

This device can be altered in such a way that by means of a lateral pipe the partial gas stream with the compound of an element of the 5th main group is added only between the structural element 4 and the holder 7.

The gallium semiconductor layers which are separated epitaxially according to the process of the invention have a uniform growth and have only a small silicon content. Such products are of great importance in semiconductor technology, e.g. for producing optical structural elements like luminescent diodes and for field effect transistors.

EXAMPLE 1

A gas stream charged with 0.1% by volume of gallium-III - chloride, 0.1% by volume arsenic-III-chloride and 0.05% by volume phosphorus-III-chloride is piped into the pipe-like structural element 4 of graphite heated to 750° C. and filled with finely divided tungsten, and after passing through, it hits the monocrystalline gallium arsenide substrate 6 with a linear flow speed of 5 cm./sec. The latter is held by the holder 7 made of graphite, as shown in the drawing, and has a temperature of 600° C. In this manner one can produce an epitaxial layer of a mixed crystal consisting of about 70% gallium arsenide and about 30% gallium phosphide, with a deposition speed of about $0.5\mu$/min. After a two-hour treatment a layer $60\mu$ thick had been formed.

EXAMPLE 2

A stream of hydrogen charged with 0.1% by volume gallium-III-chloride, 0.15% by volume arsenic-III-chloride and $1\times10^{-3}$ percent by volume chromyl chloride is piped through the pipe-like structural element 4 of graphite heated to 750° C. containing finely divided molybdenum, and hits a monocrystalline gallium arsenide substrate 6 at 690° C. with a linear flow speed of 5 cm./sec. In this manner one can produce an epitaxic gallium arsenide layer with a deposition speed of about $0.5\mu$/min., with a specific resistance of greater than $10^6$ ohms$\times$cm.

EXAMPLE 3

A stream of hydrogen charged with 0.4% by volume gallium-III-chloride, 0.1% by volume arsenic-III-chloride and 0.05% by volume phosphorus-III-chloride is piped through the pipe-like structural element 4 which is heated to 800° C. and hits with a linear flow speed of 10 cm./sec. at 600° C. a moncrystal of magnesium-aluminum-spinel, whose chemically etched (100)-surface is used as substrate. In this manner one can produce on this insulating substrate an epitaxial layer of a mixed crystal consisting of 70% gallium arsenide and 30% gallium phosphide with a deposition speed of about $0.3\mu$/min.

The invention claimed is:

1. Method of producing epitaxial III–V semiconductor layers containing gallium in two stages, which comprises first producing gallium-I-chloride by heating a gas stream consisting of hydrogen and gallium-III-chloride to a temperature of 700–900° C. in the presence of a catalyst consisting of an element selected from the group consisting of niobium, tantalum, nickel, palladium, platinum, tungsten and molybdenum, and in a second stage converting said gallium-I-chloride into a gas stream of III–V semiconductor material by heating said gallium-I-chloride to a temperature of 600–700° C. in admixture with an element of the 5th main group of the Periodic System, and then epitaxially depositing said III–V semiconductor material on a semiconductor substrate.

2. Method according to claim 1, in which the gas stream consisting of hydrogen and gallium-III-chloride contains 0.05–1% by volume gallium-III-chloride.

3. Method according to claim 2, in which up to 90% by volume of argon is added to the said gas stream.

4. Method according to claim 1, in which said catalyst is selected from the group consisting of tungsten and molybdenum.

5. Method according to claim 1, in which either gas stream contains a doping substance selected from the group consisting of hydrogen selenide and diethyl zinc.

6. Method according to claim 1, in which either gas stream contains a compound selected from the group consisting of chromyl chloride and chromium hexacarbonyl.

7. Method according to claim 1, in which the element of the 5th main group of the Periodic System is formed from a compound selected from the group consisting of arsenic trichloride, arsenic hydride, phosphorus trichloride and hydrogen phosphide.

8. Method according to claim 1, in which said substrate is a semiconductor crystal.

9. Method according to claim 1, in which said substrate is an insulator monocrystal.

10. Method according to claim 1, in which the element of the 5th main group of the Periodic System is arsenic or phosphorus.

References Cited

UNITED STATES PATENTS

| | | | |
|---|---|---|---|
| 3,310,425 | 3/1967 | Goldsmith | 117—106 A |
| 3,322,575 | 5/1967 | Ruehrwein | 148—175 |
| 3,511,723 | 5/1970 | Burd | 117—106 A X |
| 3,471,324 | 10/1969 | Wilson et al. | 117—201 |

OTHER REFERENCES

Lawley, K. L.: "Film-Making: A Delicate Job Performed Under Pressure," Electronics, Nov. 13, 1967, pp. 114–5.

Conrad, et al.: "Incorporation Of Zinc Into Epitaxial GaAs Using Diethyl Zinc," J. Electrochem Soc. February 1966, pp. 199–201.

ALFRED L. LEAVITT, Primary Examiner

K. P. GLYNN, Assistant Examiner

U.S. Cl. X.R.

117—106A; 148—175; 252—46E; 423—21, 87R